Nov. 6, 1934.  J. C. JOHNSTON  1,979,470
METHOD OF JOINING BELL AND SPIGOT PIPE SECTIONS
Filed May 10, 1930
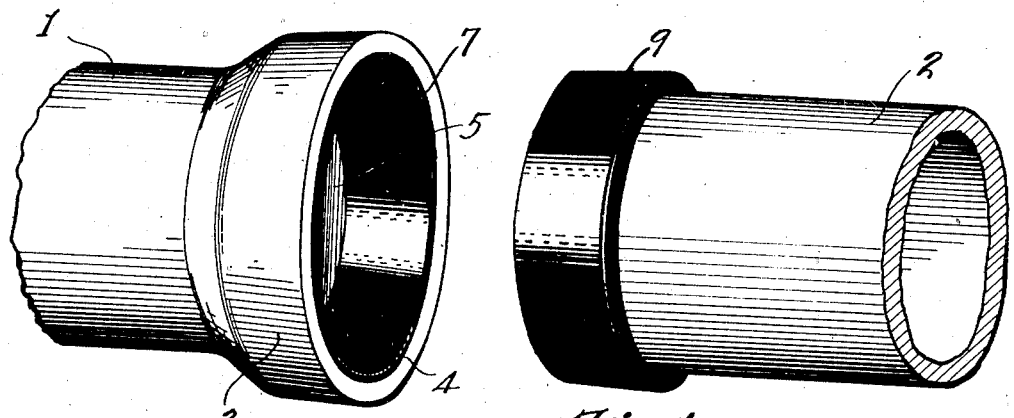
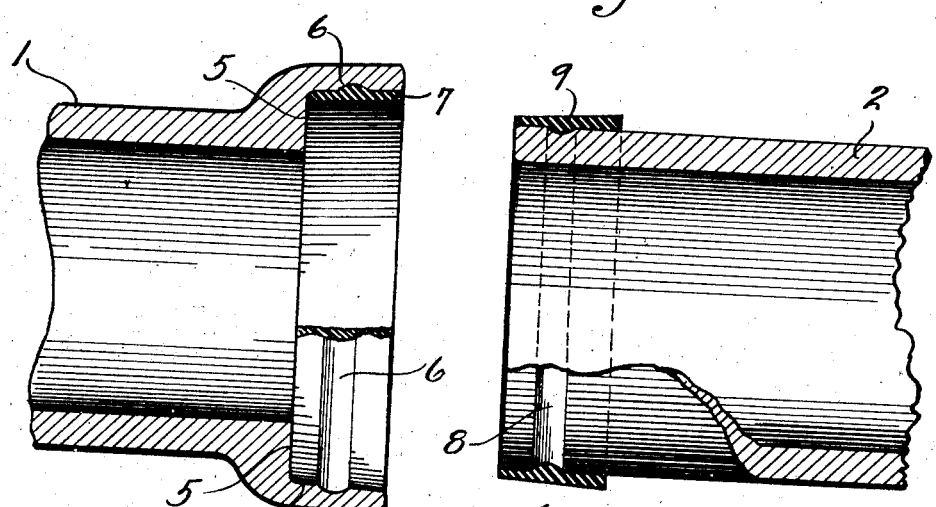
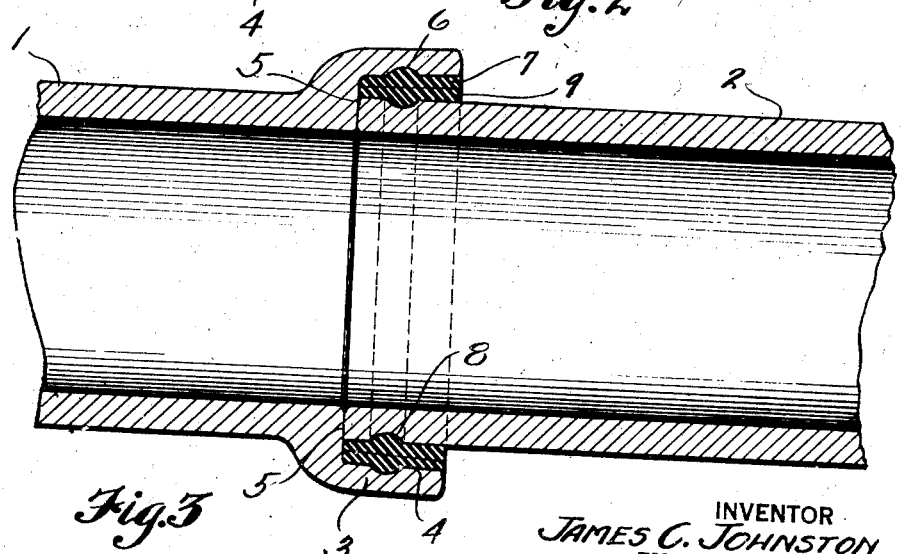
INVENTOR
JAMES C. JOHNSTON
BY
Cook & Robinson
ATTORNEY Patented Nov. 6, 1934

1,979,470

UNITED STATES PATENT OFFICE 1,979,470

METHOD OF JOINING BELL AND SPIGOT PIPE SECTIONS

James C. Johnston, Seattle, Wash., assignor to Gladding McBean & Company, a corporation of California Application May 10, 1930, Serial No. 451,275

2 Claims. (Cl. 18—59)

This invention relates to improvements in pipe joints and it has reference in particular to a method and means for joining together of sections of pipe, such as that ordinarily employed for sewers, drainage, water, or any type of conduit, wherein it is required that the joints withhold pressure to a considerable amount and that they be substantially tight to prevent leakage under ordinary conditions of use.

It is the principal object of the present invention to provide an improved type of connecting joint for the ends of sewer tiling, or the like, wherein one end of each tile section is provided with a bell, or socket for receiving therein the spigot, or straight end portion of the adjoining tile section; the said improved joint being designed to eliminate the necessity of cementing, calking, or otherwise applying a sealing material to the joints at the time the pipe is laid.

Explanatory to the invention, I will state that it has been the usual practise heretofore when tiling of the above character was laid, to assemble the pipe sections together by inserting the spigot end of each successive tile into the bell end of the preceding one, and to then fill the joint with a suitable cement. This operation usually has to be carried on within a ditch or tunnel in which the pipe is being laid, and where the work is done under difficulties and consequently, the sealing of joints is a very slow operation and poor joining frequently occurs.

There is the disadvantage in the ordinary method of laying tile, or sewer pipe, that the pipe sections are not always properly centered, and it is practically impossible when the spigot end of one pipe is pushed into the bell end of the other, to prevent the jointing cement from being squeezed up into the pipe at the joint. Either of these undesirable results is detrimental to effective use of the pipe since they cause sewage to be caught and held. This generally causes clogging.

In view of the above disadvantages, it has been the main object of the present invention to provide a joint that is not only durable, practical and exceedingly tight, but which may be prepared prior to the actual assembling together and is finished by the simple operation of assembling the sections together; thereby avoiding the usual difficulties and delay at the time the pipe is laid, and at the same time insuring a tightly sealed and permanent connection.

Specifically stated, the present invention resides in molding linings about the inside surface of the bell or socket ends of the sections consisting of plastic sealing material, and likewise, molding bands or collars of a like material about the outside of the spigot ends of the sections; these bands or collars being slightly tapered and corresponding to the taper of the linings provided in the bell ends so that they may be inserted within the latter to tightly wedge therein and to thus make possible their being united in a homogeneous mass to effectively seal the joint.

Another object of the invention is to provide encircling grooves within the bell and about the spigot end of each section of pipe for receiving the plastic sealing material therein to form locking keys for preventing any possible disconnection of the sections after the joint has been sealed.

In accomplishing these and other objects of the invention, I have provided the improved details of construction, the preferred forms of which are illustrated in the accompanying drawing, wherein—

Figure 1 is a perspective view showing the end portions of tile sections which are to be joined and which have been provided with joint sealing material, in accordance with the details of the present invention.

Figure 2 is a sectional detail of the ends of the tile sections in disconnected relation.

Figure 3 is a similar view of the ends after being connected illustrating the use of grooving for anchoring the jointing material to the pipe sections.

Referring more in detail to the drawing—

1 and 2, respectively, designate the adjacent end portions of tubular tiling sections which are to be joined in accordance with the present invention. The section 1 has an end portion provided with an enlarged bell 3 forming an open socket 4 which may be slightly tapered in an inward direction and which terminates at its base in a flat annular shoulder, or abutment 5. Encircling the flange of the bell in its inner surface is a shallow groove or channel 6 and molded within the inner surface of the bell is a lining 7 of joint sealing material which may be a prepared asphalt composition, tar, or any other suitable plastic material, which may be molded into place and which will set sufficiently to retain its form after being molded. The inner surface of this molded lining is slightly tapered inwardly to provide for a wedging fit within its complemental part, as will presently be described.

The adjacent spigot end portion of the tiling section 2 is adapted to be projected into the bell or socket portion 3. It is provided near the end with a shallow encircling groove, or channel 8 and molded about this end portion is a collar or band 9 of the plastic, joint forming material. This band likewise would be molded about the pipe end so that it would fill the groove and would thereby form a key to lock itself to the pipe. This collar would be slightly tapered to conform to the taper of the inner surface of the lining of the bell portion and it would be of proper dimensions to fit tightly within the lining of the bell end portion of the tile section 1 for sealing the joint.

It is to be understood that the lining 7 in the bell and the collar or band 9 on the spigot end of the pipe sections would be molded thereon by any suitable means before the time the tile is actually assembled for use, and preferably would be done at the factory under the most favorable conditions and while the tiling is thoroughly dry and clean so as to positively insure adherence of the jointing material to the pipe. After the jointing material has been molded in place, it is permitted to set and the pipe sections may be stored away until ready for use. At the time assembly is made for the construction of a drainage pipe conduit, or sewer pipe, or the like, it is only required that the spigot ends be projected into the socket ends to cause the collar portions 9 to wedge tightly within the lining of the bell ends. Prior to joining the parts together a solvent or softener, such as gasoline, is applied to the surfaces of the lining and collar. This solvent softens the surfaces so that when the sections are fitted together the softened surface of the collar will unite with the softened surface of the lining and as the solvent evaporates, the two parts will unite to form an integral homogeneous mass and by reason of the key portions formed and the encircling groove of the joined sections, the joint will serve as a key or lock to prevent disconnection of the pipe sections.

It is to be understood that I make no claim to any specific joint forming composition. The composition or material used may consist of any suitable material, either plastic, semi-plastic, or otherwise which may be molded to form a lining within and a collar about the bell and spigot ends, respectively, of the joint and which will readily adhere and conform to each other when the sections are properly assembled.

A joint of this character is suitable for various kinds of pipes, or tiling, and it is not intended that the invention be limited in its use to any particularly shaped tiling or pipe, or to pipes used for any particular purpose or of pipes made of any particular material; the present disclosure shows it in its preferred and most common use.

Drainage pipes, or the like, made up of sections joined in the manner above specified, are not damaged by slight ground sag, or torque, since the joint is of a flexible character and permits of considerable relative movement of sections without opening the joint, or in any way damaging it. In this respect, it presents an advantage over the commonly used cement joint which breaks away and opens up when ground sag occurs.

Some of the advantages of this construction are:

First, the jointing material may be cast on the pipe sections at the plant under the most favorable conditions and by methods that will insure maximum adherence to the pipe.

Second, pipes equipped with jointing material in this manner can be laid under any climatic conditions and in any kind of soil.

Third, joints so prepared will positively center the pipe sections automatically thus insuring perfect alinement and avoiding the bulging of the jointing material into the pipe with resultant clogging.

Fourth, no damming or bulkheading is necessary as the joint can be made under water, if this is necessary.

Fifth, a minimum of trenching and tunnelling is necessary.

Sixth, pipe sections so joined allow immediate back-fill of the trench or ditches in which they are laid.

Seventh, such joints facilitates the usual inspection required of such pipes.

Eighth, the joint absorbs no ground water and in turn prevents ground contamination. Infiltration need not be considered.

Ninth, such joints withstand pressure to advantage beyond that which is required of them and are root-proof.

Tenth, a joint so formed is flexible, permitting slight torque or ground sag without injury to the joint.

Eleventh, the joint is pre-shrunk and is ready for immediate use.

Twelfth, pipes laid of joints of this character save considerable pumping expense for drainage, as it permits immediate use of the pipes for this purpose.

Joints of this type of construction provide an easy and a ready assembly of the pipe sections, and provide also a substantially tight and durable joint. The difficulty of assembling pipes in close quarters and then sealing by cement or other materials applied to the joint at the time the pipe is laid is hereby overcome and the cost of preparing the joint has been found to be relatively inexpensive.

Having thus described my invention what I claim as new therein and desire to secure by Letters Patent, is:

1. The method of joining bell and spigot pipe sections consisting of molding a collar of soluble joint sealing material about the spigot end of one section, molding a lining band of like material within the bell end of another section within which the collar equipped end of the first section may be fitted, then applying an evaporable solvent to the surfaces of the collar and lining band to render them plastic and subsequently fitting them together to cause said plastic surfaces to unite and congeal incident to evaporation of the solvent therefrom, thereby joining the collar and lining band in a homogeneous seal.

2. The method of joining bell and spigot pipe sections consisting of molding a tapering collar band of soluble joint sealing material about the spigot end of one section, molding a lining collar of similar material within the bell end of another section within which the collar band of the first section may be inserted in a fitted joint, then applying an evaporable solvent to the surfaces of the collar and lining to render them plastic, then fitting the sections together to cause the plastic surfaces to unite and congeal, incident to evaporation of the solvent therefrom, in a solid, homogeneous seal.

JAMES C. JOHNSTON.